(12) United States Patent
Aschner et al.

(10) Patent No.: US 6,244,050 B1
(45) Date of Patent: Jun. 12, 2001

(54) APPARATUS FOR REGULATING THE PRESSURE IN AN INTERNAL COMBUSTION ENGINE INTAKE DUCTS

(75) Inventors: Werner Aschner, Ulm; Ralf Binz, Sindelfingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/523,092

(22) Filed: Mar. 10, 2000

Related U.S. Application Data

(62) Division of application No. 08/859,249, filed on May 20, 1997, now Pat. No. 6,058,706.

(30) Foreign Application Priority Data

May 23, 1996 (DE) ............................................. 196 20 778

(51) Int. Cl.[7] ................................................. F02B 37/18
(52) U.S. Cl. ................................................. 60/600; 60/602
(58) Field of Search ............................. 60/600, 601, 602, 60/603

(56) References Cited

U.S. PATENT DOCUMENTS

| | | | |
|---|---|---|---|
| 4,848,086 | * 7/1989 | Inoue et al. | ............................ 60/602 |
| 5,088,462 | * 2/1992 | Hertweck et al. . | |
| 5,155,998 | * 10/1992 | Monden | ................................. 60/602 |
| 5,261,236 | * 11/1993 | Ironside et al. | ........................ 60/600 |
| 5,289,684 | * 3/1994 | Yoshioka et al. . | |
| 5,442,918 | * 8/1995 | Baeuerle et al. | ........................ 60/602 |
| 5,680,763 | * 10/1997 | Unland et al. | .......................... 60/602 |
| 5,782,092 | * 7/1998 | Schultalbers et al. . | |

FOREIGN PATENT DOCUMENTS

| | | | |
|---|---|---|---|
| 3303350 | * 8/1984 | (DE) | ..................................... 60/602 |
| 3939754 | * 6/1991 | (DE) . | |
| 4330368 | * 3/1995 | (DE) . | |
| 0 757 169 | * 2/1997 | (EP) . | |
| 2714697 | * 7/1995 | (FR) . | |
| 2105878 | * 3/1983 | (GB) | ..................................... 60/600 |

* cited by examiner

*Primary Examiner*—Michael Koczo
(74) *Attorney, Agent, or Firm*—Evenson, McKeown, Edwards & Lenahan, P.L.L.C.

(57) ABSTRACT

A method and apparatus regulates the pressure in the intake duct of an internal combustion engine. The internal combustion engine has a control unit, in which a desired pressure value is determined. The current pressure in the intake duct is adjusted to the desired value by a valve device, and the valve device is acted upon by an actuating signal from the control unit. In order to build up the pressure in the intake duct with a suitable dynamic response for each load state, particularly when using a number of valve devices, the actuating signal is used as a control signal, as a function of a relative desired pressure valve, from a control characteristic map stored in the control unit. A controller signal produced in a controller is superimposed on the control signal if required.

14 Claims, 4 Drawing Sheets

APPARATUS FOR REGULATING THE PRESSURE IN AN INTERNAL COMBUST ION ENGINE INTAKE DUCTS

This application is a division of application Ser. No. 08/859,249, filed May 20, 1997, now U.S. Pat. No. 6,058,706.

This application claims the priority of DE 196 20 778.9, the disclosure of which is expressly incorporated by reference herein.

BACKGROUND AND SUMMARY OF THE INVENTION

The present invention relates to a method for regulating the pressure in the intake duct of an internal combustion engine having an exhaust turbocharger and a control unit configured to determine a desired pressure value as a function of the current load, comprising the steps of setting current pressure in the intake duct via a valve to the desired pressure value to be set, and actuating the valve as a function of an actuating signal produced by the control unit. The present invention also relates to an apparatus for carrying out the foregoing method, which has a throttle valve in the intake duct, an exhaust turbocharger arranged in an exhaust line, a bypass valve, a bypass conduit arranged to be shut off by the bypass valve and to bypass the turbocharger, and a control unit configured to effect a load-dependent setting of the throttle valve and the bypass valve.

DE 39 39 754 A1 describes an internal combustion engine with an exhaust turbocharger having a turbine driven by the stream of exhaust gas and driving a compressor in the intake duct. The turbine in the exhaust line is bypassed by a bypass conduit, which can be shut off by a bypass valve. The regulation of the intake duct pressure to a specified desired pressure value is accomplished by adjusting a throttle valve in the intake duct and by actuating the bypass valve. Thereby, the stream of exhaust gas fed to the turbine of the exhaust turbocharger can be adjusted. The position of the throttle valve and of the bypass valve is determined by a control unit as a function of the load state of the internal combustion engine. For this purpose, actuating signals for actuating drives assigned to the throttle valve and the bypass valve are produced in a control unit. In order to adjust the pressure in the intake duct to the intended desired value, the throttle valve is first of all pivoted in the direction of complete opening of the intake duct in the low-load range of the internal combustion engine. If a further pressure rise in the intake duct is required even after the maximum throttle-valve open position has been reached, the bypass valve is moved as a function of the load by the control unit from its open position up to that time into its closed position. As the load increases, the bypass conduit is therefore shut off, so that an increasing stream of exhaust gas impinges on the turbocharger. This allows a higher desired pressure to be achieved in the intake duct.

Depending on the load state of the internal combustion engine, the controller implemented in the control unit acts upon either the throttle-valve position or the position of the bypass valve. In the transitional range from part load to full load of the internal combustion engine, only a limited dynamic response of the pressure build-up in the intake duct can thereby be achieved. The sequential actuation of the throttle valve and the bypass valve, owing to the common controller for both valve devices, results in an unavoidable regulation delay. Because of the intrinsic dynamic response of the throttle valve and the bypass valve, there is a delay upon each transition of the actuation of one of the two valve devices. It is furthermore disadvantageous that the controller can only be set in an optimum manner for one of the two valve devices. Consequently, optimum regulation of the other valve is impossible.

An object of the present invention is to provide a method and an apparatus for building up the pressure in the intake duct of an internal combustion engine with a suitable dynamic response for each load state, particularly when using a number of valve devices.

According to the invention, this object has been achieved with a method in which the actuating signal is taken as a control signal, as a function of a corrected relative desired pressure value, from a control characteristic map stored in the control unit. When required, a controller signal produced in a controller, in which one input variable is a signal formed from adding the current pressure and the desired value to be set, is superimposed on the control signal. The apparatus for carrying out the foregoing method has a desired-value transmitter and a controller unit, the latter having a switching-signal transmitter, a switching element, a memory with respective control characteristic maps for the throttle valve and the bypass valve and respective controllers, each of which is independently activatable as a function of predetermined switching criteria by the switching-signal transmitter and the switching element.

According to the method of the present invention, adjustment of the pressure in the intake duct is performed by control with superimposed regulation. The actuating signal is made up of a control signal, which is taken from a control characteristic map as a function of a corrected desired pressure value, and of a controller signal, which is superimposed on the control signal as required, in order to achieve exact setting of the pressure to the intended desired value. The permanently active controller ensures that the valve device is supplied continuously with an actuating signal and there are thus no delays due to a dynamic response of the valve device. The control signal can be matched specifically to the dynamic response of the valve device. The superimposed regulation which is switched in as required ensures that the specified desired pressure value can be set exactly and without steady-state error.

A second valve device can be provided for regulating the intake pressure. A second actuating signal independent of the first actuating signal is advantageously produced by the control unit and is taken from a second control characteristic map tailored to the second valve device. This second control signal can, in turn, have a dedicated controller signal superimposed thereon, with the controller signal being produced in a second controller. The controller signals of the first and the second controllers are completely independent and it is advantageous, depending on the load applied, for only one of the two controllers to be activated. One of the two controllers can be activated by a switching signal dependent on the specified desired pressure value. The first controller is preferably assigned to the part-load range and the second controller to the full-load range.

Each of the two controllers is assigned a control characteristic map with a control signal taken from it which acts continuously on the valve devices. Consequently, both valve devices can be operated independently of one another in the transitional range between part load and full load. This provides a favorable dynamic pressure build-up in the intake duct. Also, the separate regulation allows determination of the regulation parameters in a manner matched to the respective valve device.

The calculation of the desired pressure value preferably includes characteristics such as the engine speed and the power demand by the driver. These variables characterize the load state of the internal combustion engine. Ambient conditions such as the ambient air pressure, the temperature of the intake air and the temperature of the cooling water can be included as further influencing variables. All the influencing variables can be defined in the form of characteristic maps, and a plurality of characteristic maps can be provided for each influencing variable. These maps are assigned to the various load ranges of the internal combustion engine. The respective characteristic map is activated by a switching signal which reflects the load state of the internal combustion engine. A PI controller signal is advantageous in this regard because there is no remaining steady-state system error.

The desired pressure value is fed to a switching-signal transmitter in which a hysteresis curve is implemented as a switching curve for the load-dependent activation of one of the two controllers. The hysteresis curve lies between a lower and an upper pressure limit value. A switched change between the controllers takes place when the desired pressure value reaches one of the two limit values.

As an additional condition, a switched change can also take place when the controller signal either of the first or second controller exceeds or undershoots a specified controller limit value. This additional switching condition ensures that the desired intake-pipe pressure is achieved in all cases, even if individual engine components are not operating correctly, as a result of, for example, soiling or contamination. The additional switching condition ensures that a switch is made to the controller for the higher load range in time to reach the desired pressure, even if this is not necessary according to the switching curve stored in the switching-signal transmitter.

The apparatus for carrying out the above-described method includes a throttle valve in the intake duct as the first valve device and a bypass valve in the bypass conduit which bypasses the turbocharger as the further valve device. The control unit which supplies the actuating signals for the regulation of the throttle valve and the bypass valve includes a desired-value transmitter for determining the desired pressure value and a controller unit. The controller unit comprises a memory with respective control characteristic maps for the throttle valve and the bypass valve, and respective controllers.

The controllers can be activated by a switching-signal transmitter and a switching element which are likewise part of the controller unit.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
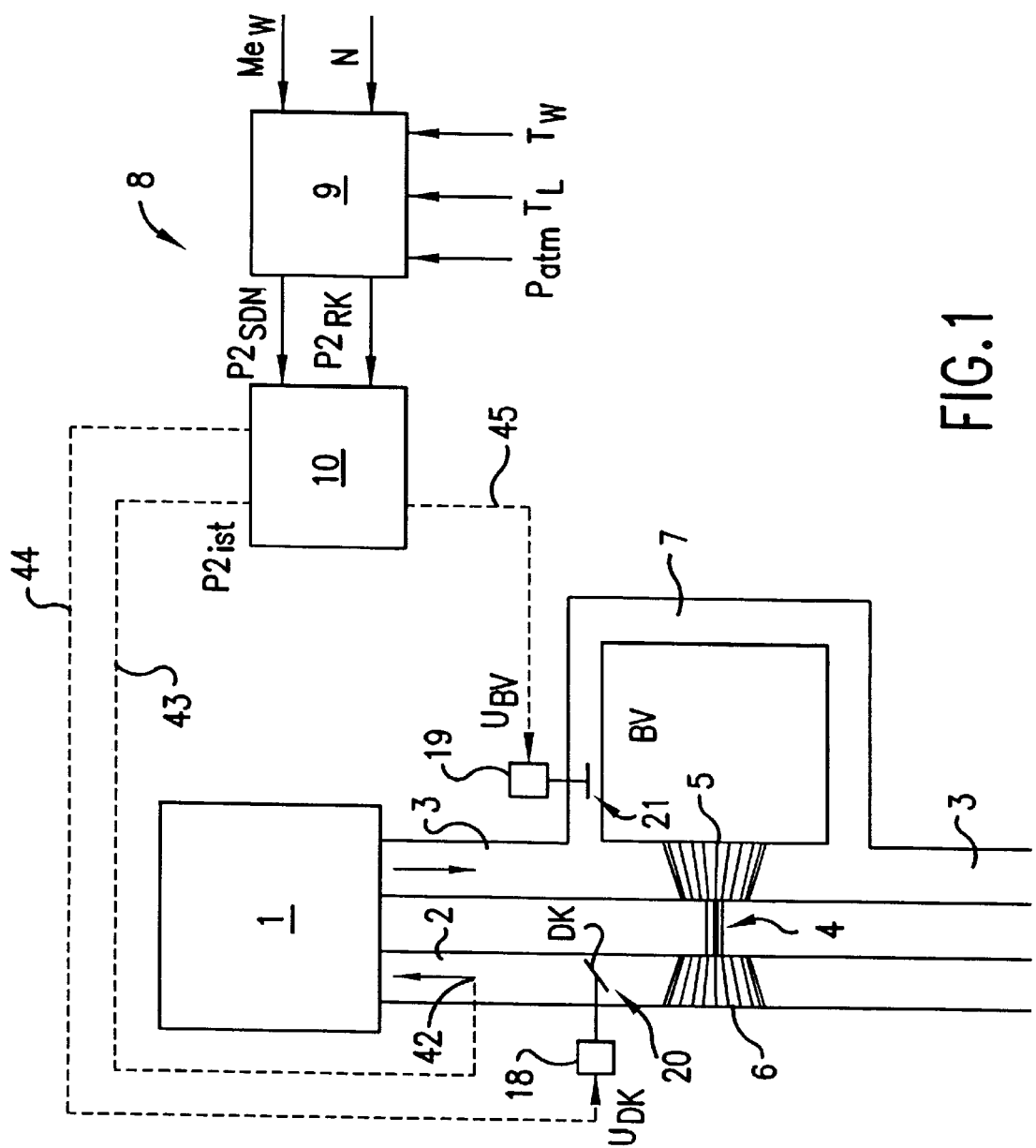
FIG. 1 is a schematic diagram of an internal combustion engine with an exhaust turbocharger and two valve devices to be regulated by a control unit in accordance with the present invention.

FIG. 1 shows an internal combustion engine 1 which is embodied as a diesel internal combustion engine. The internal combustion engine 1 is supplied with combustion air via the intake duct 2. An exhaust turbocharger 4 has turbine 5 arranged in the engine exhaust line 3 and operated by the exhaust gases. The turbine 5 drives a compressor 6 of the turbocharger which is arranged in the intake duct 2 upstream of a first valve device 20. In the illustrated embodiment, the valve device 20 is a throttle valve DK which, to achieve a desired intake pressure in the intake duct 2, is pivoted by an actuator 18 into the required position A bypass conduit 7 is provided in the exhaust line 3 to bypass the turbine 5 of the turbocharger 4, branches off from the exhaust line 3 upstream of the turbine 5 and opens into the exhaust line again downstream of the turbine 5. The bypass conduit 7 can be shut off by a second valve device 21 which can be in the form of a bypass valve BV or the like. The bypass valve BV can be pivoted by an actuator 19 between an open position, in which the cross-section of the bypass conduit 7 is completely open, and a closed position, in which the bypass conduit is completely shut off. In the closed position of the bypass valve BV, the entire stream of exhaust gas is passed through the turbine 5 of the turbocharger 4 to thereby develop maximum turbocharger power. The closed position of the bypass valve BV is therefore assigned to the high-load range or full-load range of the internal combustion engine whereas, in the open position of the bypass valve BV, the internal combustion engine 1 is in the low-load range.

A control unit designated generally by numeral 8 comprises a desired-value transmitter 9 for determining the desired pressure value and a controller unit 10 which, in the event of a deviation of the current pressure $P_{ist}$ in the intake duct 2 from the specified desired value $P2_{soll}$, supplies an actuating voltage UDX or UBV to the actuator 18 or 19 of the throttle valve DK or bypass valve BV.

The input variables of the desired-value transmitter 9 of the control unit 8 are a power demand $M_{eW}$ of the driver, which is proportional to the current load state of the internal combustion engine, and the current engine speed N. As output variables, the desired-value transmitter 9 supplies an (absolute) desired pressure value $P2_{soll}$ to be set and a relative desired pressure value $P2_{RK}$. The influence of the ambient air pressure $P_{atm}$, the temperature $T_L$ of the intake air and the temperature $T_W$ of the engine coolant are taken into account for the purpose of correcting the desired pressure value.

The absolute and the relative desired pressure values are fed to the controller unit 10, in which a comparison is made between the desired pressure value and the current pressure value $P2_{ist}$. The current pressure $P2_{ist}$ is recorded by a sensor 42 in the intake duct 2 and fed to the controller unit 10 via a measuring line 43. As its output, the controller unit 10 supplies the actuating voltages $U_{DK}$ and $U_{BV}$, which are fed via further measuring lines 44, 45 to the corresponding actuators 18, 19.

Figure 2:
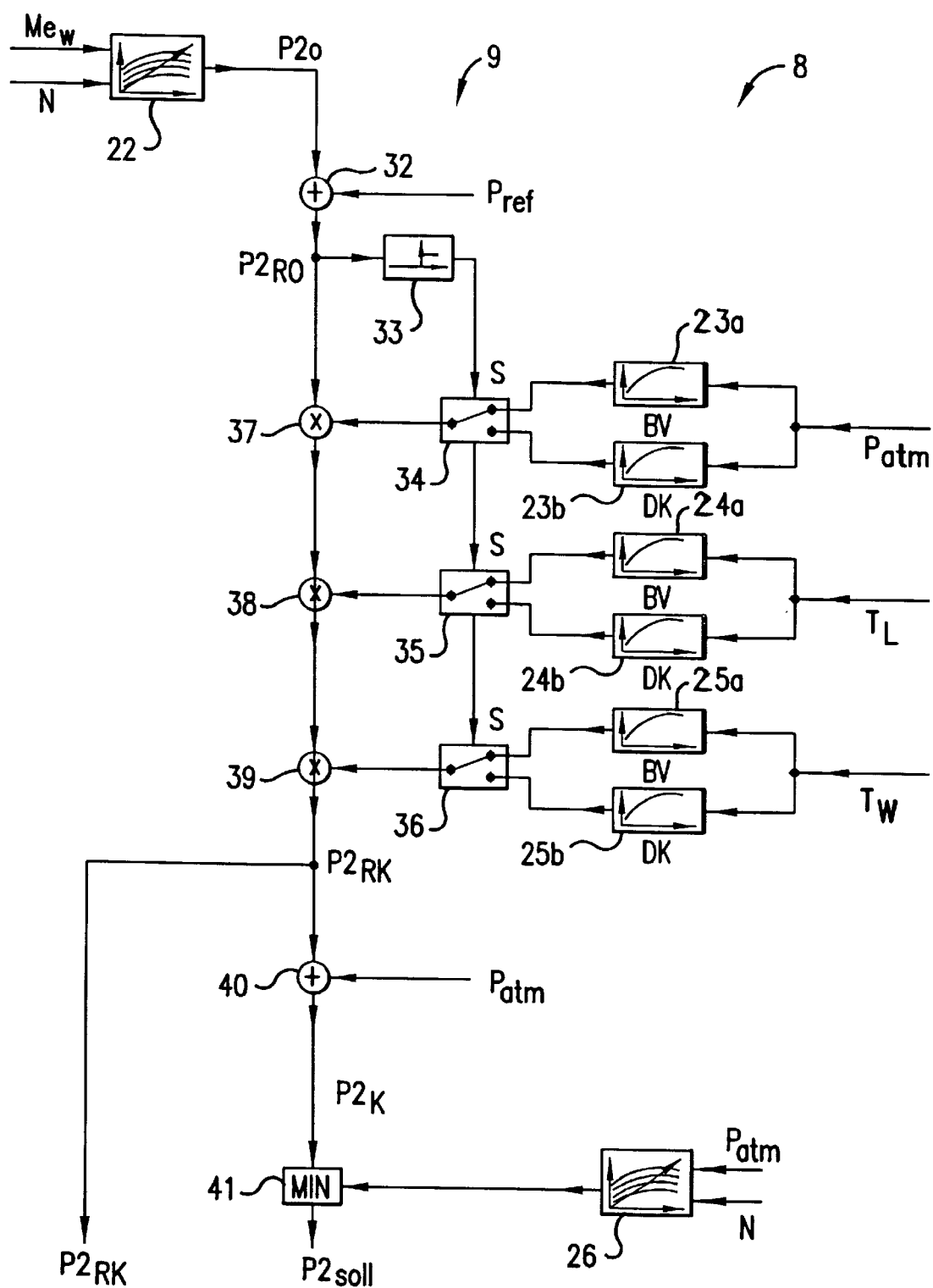
FIG. 2 is a flow diagram relating to the calculation of the desired pressure value.

The flow diagram of FIG. 2 shows determination of the desired pressure values in the desired-value transmitter 9 of the control unit 8. The power demand $M_{eW}$ of the driver and the current speed N of the internal combustion engine are read in and transformed by a first characteristic map 22 into a desired-pressure base value $P2_0$. A relative desired-pressure base value $P2_{R0}$ is produced in a summer 32 by subtraction of a settable reference pressure $P_{ref}$ which is preferably 1000 mbar.

In order to be able to include the influence of ambient conditions, the relative desired-pressure base value $P2_{R0}$ is subjected in series-connected multipliers 37, 38, 39 to correction factors which reproduce the influence of ambient conditions such as ambient air pressure $P_{atm}$, temperature $T_L$ of the intake air and temperature $T_W$ of the engine coolant. In addition, a distinction can be drawn for each influencing variable as to whether the internal combustion engine is in the part-load range or in the full-load range. For this purpose, a comparison element 33 with a two-point characteristic is provided which, depending on the magnitude of the relative desired-pressure base value $P2_{R0}$, supplies an output signal S which represents the current load state of the internal combustion engine. If the relative desired-pressure base value $P2_{R0} < 0$ (part-load range, control is to take place by way of the throttle valve DK), the comparison element 33 supplies a value equal to zero for S. For $P2_{R0} \geq 0$ (full-load range, pressure regulation by way of bypass valve BV), the switching signal S is thus 1.

The switching signal S is fed to the series-connected switching elements 34, 35, 36, and, for S=1, activate the characteristic maps 23a, 24a, 25a, assigned to the bypass valve BV, for the ambient characteristic variables $P_{atm}$, $T_L$, $T_W$ and, for S=0, correspondingly activates the characteristic maps 23b, 24b, 25b assigned to the throttle valve. After multiplication of the ambient characteristic variables by the relative desired-pressure base value $P2_{R0}$, the obtained corrected relative desired pressure value $P2_{RK}$ is picked up and fed to the controller unit.

To determine the absolute desired pressure value, the corrected relative desired pressure value $P2_{RK}$ is additionally subjected in a summer 40 to the current ambient air pressure $P_{atm}$, from which the corrected absolute desired value $P2_K$ is obtained. In a subsequent comparison element 41, the absolute desired value $P2_K$ is limited by a minimum-value function to a maximum P2 limit value. Adaptation as a function of the ambient air pressure $P_{atm}$ and the current engine speed N takes place by way of an additional characteristic map 26. The limitation of the P2 limit value by the minimum-value function serves to protect the turbocharger from overspeeds at relatively high altitudes. As an output variable following the comparison element 41, the absolute desired pressure value $P2_{soll}$, to be set is then obtained.

Figure 3:
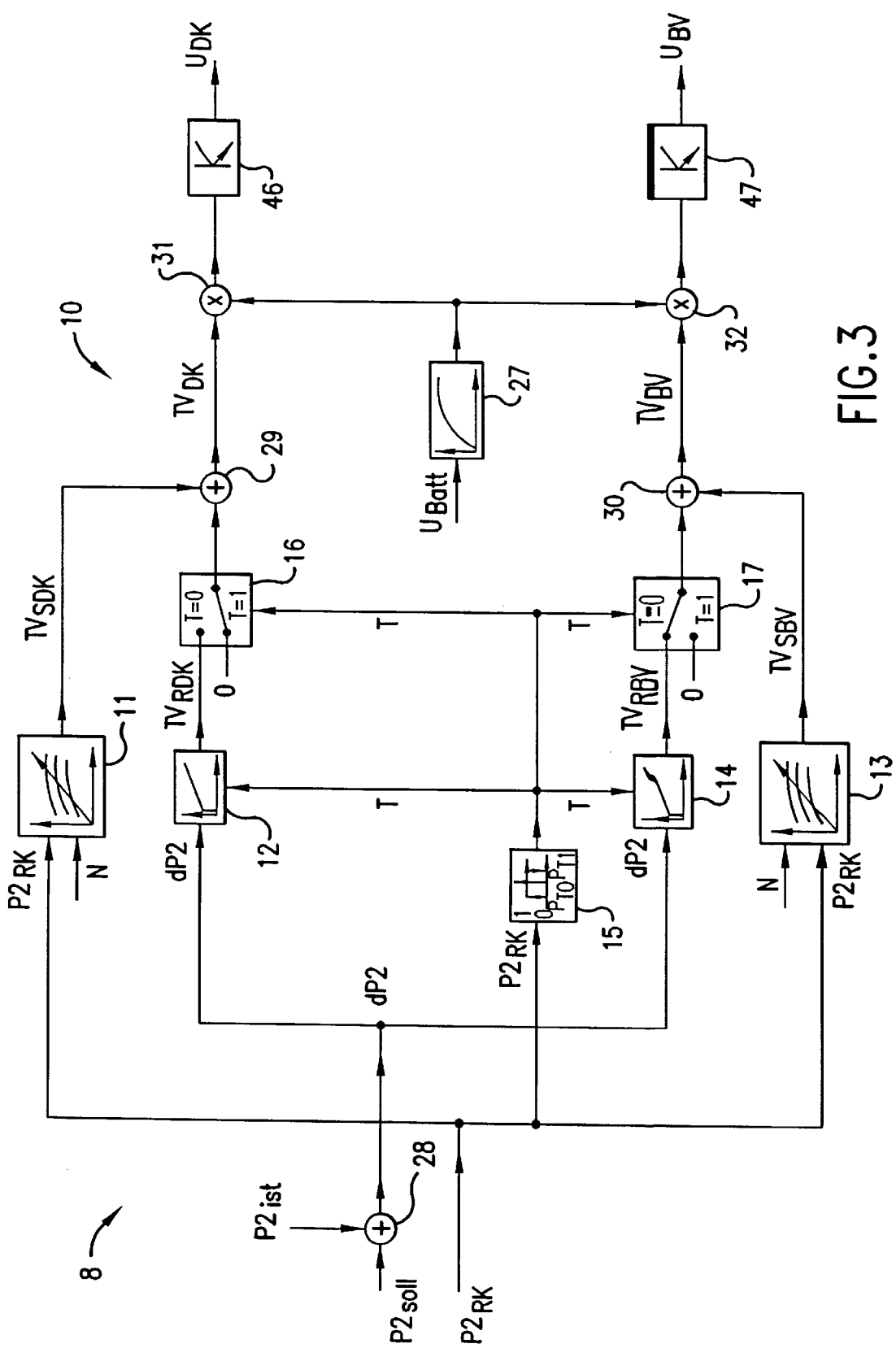
FIG. 3 is a flow diagram relating to the calculation of the actuating variables for each valve device.

The flow diagram of FIG. 3 shows that now the actuating signals in the controller unit 10 of the control unit 8 are determined. The desired pressure values $P2_{soll}$, $P2_{RK}$ supplied by the desired-value transmitter are fed to the controller unit 10 as input variables and processed therein.

The corrected relative desired pressure value $P2_{RK}$ is fed as an input variable to the parallel-connected control characteristic maps 11, 13 of the throttle valve and the bypass valve. The control characteristic maps 11, 13 supply a control signal $TV_{SDK}$ or $TV_{SBV}$ as the output variable. As a further input variable, the current engine speed N is taken into account in the determination of the control signals.

The control characteristic maps 11, 13 are active for the entire operation of the internal combustion engine and supply the control signals $TV_{SDK}$, and $TV_{SBV}$ (duty ratio) irrespective of whether the control system is switched on or off. Both the throttle valve and the bypass valve are supplied continuously with control signals. Consequently, there are no problems such as, for example, delays owing to the intrinsic dynamic response of the throttle valve and the bypass valve.

The absolute desired-pressure value $P2_{soll}$ is fed to a summer 28, in which the system deviation dP2 is formed by subtraction of the current pressure $P2_{ist}$. The system deviation dP2, which represents the deviation of the actual pressure $P2_{ist}$, from the specified absolute desired pressure $P2_{soll}$, is fed as an input variable to a first controller 12 for the throttle valve and a parallel-connected second controller 14 for the bypass valve. In the illustrated embodiment, the controllers 12, 14 are PI controllers. The constants of the proportional component and of the integral component are each matched to the dynamic response of the throttle valve and the bypass valve.

The controllers 12, 14 of the throttle valve and the bypass valve, respectively, supply a respective controller signal $TV_{RDK}$ and $TV_{RBV}$, which is then fed to a respective summer 29, 30. In the summer 29, the throttle-valve actuating signal $TV_{DK}$ is formed by summation of the control signal $TV_{SDK}$ and the controller signal $TV_{RDK}$. The bypass-valve control signal $TV_{BV}$ is accordingly formed in the summer 30 by summation of the control signal $TV_{SBV}$ and the controller signal $TV_{RBV}$.

The summers 29, 30 are each arranged upstream of a multiplier 31, 32, in which the actuating signals $TV_{DK}$ and $TV_{BV}$, respectively, are multiplied by a battery voltage $U_{Batt}$. From the multipliers 31, 32, the corresponding output variables are fed to output stages 46, 47, in which, as a function of the actuating signals $TV_{DK}$ and $TV_{BV}$. An actuating voltage $U_{DK}$ and $U_{BV}$, respectively, is produced in the output stages 46, 47 as a function of the actuating signals $TV_{DK}$ and $TV_{BV}$ which, as described with reference to FIG. 1, is passed to the actuators 18, 19 for the throttle valve DK and the bypass valve BV, respectively.

One, but not both simultaneously, of the controllers 12 or 14 is actuated, depending on the load state of the internal combustion engine. The decision as to which controller is activated or which controller signals are connected through to the respective summer is taken in a switching-signal transmitter 15, to which the relative desired-pressure value $P2_{RK}$ is fed as an input variable.

The magnitude of the relative desired-pressure value $P2_{RK}$ is used as a decision criterion to determine the current load state the internal combustion engine. In the part-load range, the controller 12 for the throttle valve is activated and, in the full-load range, the controller 14 for the bypass valve is activated.

The switching curve of the switching-signal transmitter 15 is implemented in the form of a hysteresis curve which lies between a predetermined lower pressure limit value $P_{T0}$ and an upper pressure limit value $P_{T1}$. The switching signal T is an output variable of the switching-signal transmitter 15 and can assume either the value 0 or the value 1. The controller signals of the throttle valve are switched through in the case of the value 0 (throttling), and the controller signals of the bypass valve are switched through in the case of the value 1 (turbocharging). A switched change from one controller to the other takes place whenever the relative desired-pressure value $P2_{RK}$ reaches one of the limit values $P_{T0}$ or $P_{T1}$.

Immediately after the starting of the internal combustion engine, the internal combustion engine is in the is part-mode range, i.e. switching signal T=0. At that point, $P2_{RK}$, assumes a value which is less than the upper limit value $P_{T1}$ of the switching curve. With increasing load and increasing engine speed, the relative desired-pressure value $P2_{RK}$, also increases. As soon as the upper pressure limit value $P_{T1}$ is reached, the switching signal switches from T=0 to T=1 whereby the internal combustion engine is now in full-load range in which regulation for the bypass valve is activated.

If the load is now reduced, the relative desired-pressure value $P2_{RK}$ is also reduced. When the lower limit value $P_{T0}$ is reached, the switching signal again switches to the value T=0 whereby the machine is in the part-load range in which throttle-valve regulation is active.

In addition to the switched change dependent on the desired-pressure value $P2_{RK}$, it is advantageous to take into account further switching conditions such as a switched change from the throttle-valve controller 12 to the bypass-valve controller 14 taking place whenever the controller signal $TV_{RDK}$ supplied by the throttle-valve controller 12 exceeds a predetermined controller limit value $TV_{DKO}$. Conversely, there is a switched change from the bypass-valve controller 14 to the throttle-valve controller 12 whenever the controller signal $TV_{RBV}$ supplied by the bypass controller 14 undershoots a predetermined controller limit value $TV_{BVU}$. The controller limit values $TV_{DKO}$, $TV_{BVU}$ are expediently of the same magnitude and are provided with opposite signs.

Figure 4:
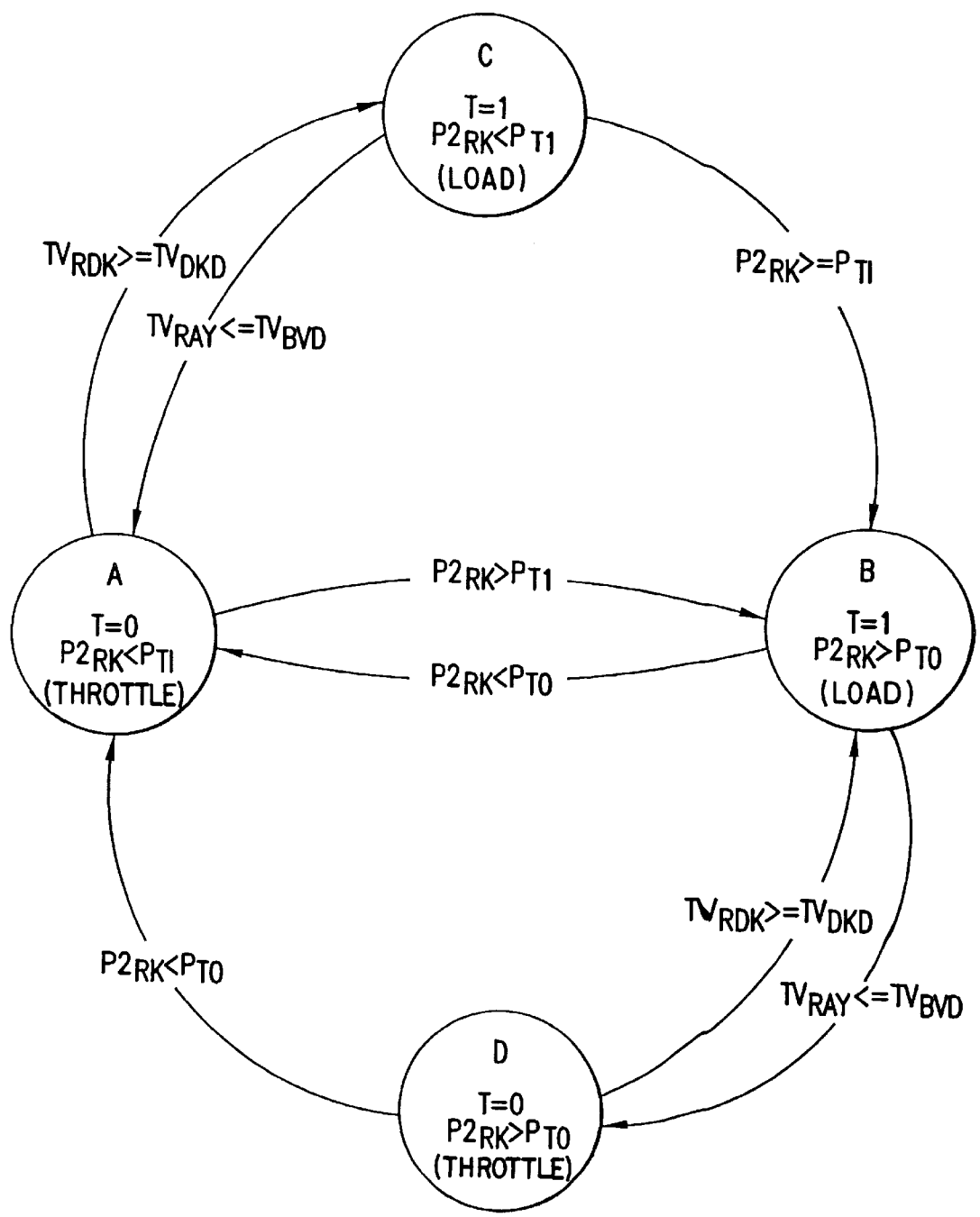
FIG. 4 is a schematic diagram of the switching conditions for switching between the controllers.

The switching diagram illustrated in FIG. 4 illustrates this additional switching condition T=0 represents the throttle-valve controller 12 being activated, and T=1 represents the bypass-valve controller 14 being activated. Immediately after starting, the internal combustion engine is in switching state A, in which the desired-pressure value $P2_{RK}$ is less than the upper pressure limit value $P_{T1}$ and the switching signal T=0. As the primary switching condition, the magnitude of the desired-pressure value $P2_{RK}$ is used. As described, a switched change to T=1, from A to B; takes place as soon as the desired-pressure value $P2_{RK}$ exceeds the upper pressure limit value $P_{T1}$. Conversely, a switched change from B to A, i.e. from bypass-valve regulation to throttle-valve regulation takes place as soon as the relative desired-pressure value $P2_{RK}$ undershoots the lower pressure limit value $P_{T0}$.

Superimposed on this primary switching condition is a further switching condition in which a switched change from T=0 to T=1 is possible even when, although the relative desired-pressure value $P2_{RK}$ has not yet reached the upper pressure limit value $P_{T1}$, the controller signal $TV_{RDK}$ of the throttle valve is above the controller limit value $TV_{DKO}$. A switched change from A to C takes place, in which the switching signal is at T=1 even though the relative desired-pressure value $P2_{RK}$ is less than the upper pressure limit value $P_{T1}$.

If the desired-pressure value $P2_{RK}$ now exceeds the upper pressure limit value $P_{T1}$, the switching state changes from C to B, although no change in the switching signal T is associated therewith. A change from switching state C to A can take place if the bypass-valve controller 14 activated in switching state C supplies a controller signal $TV_{RBV}$ which is below the predetermined limit value $TV_{BVU}$.

From switching stage B (bypass-valve controller active), switching stage D (throttle-valve controller active) can be reached even though the desired-pressure value $P2_{RK}$ is above the lower pressure limit value $P_{T0}$. The switched change from B to D takes place as soon as the controller signal $TV_{RBV}$ of the bypass-valve controller is below the corresponding controller limit value $TV_{BVU}$. Conversely, a change from switching state D to switching state B can occur if the throttle-valve controller activated in switching state D supplies a controller signal $RV_{RDK}$ which is above the controller limit value $TV_{DKO}$.

From switching state D, a direct change to A can also occur if the desired-pressure value $P2_{RK}$ falls below the lower pressure limit value $P_{T0}$. A switching-signal change and associated change of controller does not, however, take place.

The introduction of the additional switching condition ensures that a controller switchover takes place even when the intake system or the turbocharger is out of tune owing, for example, to dirt or soiling. By way of example, given an ambient air pressure $P_{atm}$=1000 mbar and a specified desired pressure value $P2_{soll}$=970 mbar, the relative desired pressure value assumes a value of −30 mbar (without influence of ambient conditions). Owing to the negative value ($P2_{RK}$ less than $P_{T1}$), the throttle-valve controller is activated. With a current intake pressure $P2_{ist}$=950 mbar as may be caused, for example, by a dirty air filter, the system error dP2=+20 mbar. The system error cannot be compensated here for by the throttle valve. A switchover to the bypass-valve-controller must take place even though the relative desired pressure value $P2_{RK}$ has not yet reached the upper limit value $P_{T1}$. The switchover to the bypass-valve controller is effected by a transition from switching stage A to switching stage C when the controller signal of the throttle-valve controller exceeds the limit value $TV_{DKO}$.

According to FIG. 3, the switching signal T is fed to a switching element 16 associated with the throttle valve and to a switching element 17 associated with the bypass valve. The throttle-valve switching element 16 is arranged directly after the controller 12 and, for T=0, feeds the controller signal $TV_{RDK}$, to the summer 29 arranged on the output side of the switching element 16 Otherwise, the switching element 16 supplies a value 0 for T+1 instead of the controller signal $TV_{RBK}$, so that in this instance the actuating signal $TV_{DK}$ is identical with the control signal $TV_{SDK}$.

Similarly, the switching element 17 arranged between the bypass-valve controller 14 and the summer 30 feeds the controller signals $TV_{RBV}$ to the summer 30 in the event of a switching signal T=1. For T=0, the switching element 17 feeds the value 0 to the summer 30, so that the actuating signal $TV_{BV}$ is identical with the control signal $TV_{SBV}$.

The switching signal T is also fed directly to the controllers 12, 14 in order to reinitialize the respectively activated controller following a switched change and thereby to avoid unwanted jumps in the controller signal. For this, it is necessary that the controller signal $TV_{RDK}$ or $TV_{RBV}$ assume the value 0 at the instant of switching on. This is achieved by the integral component of the controller being made equivalent to the negative proportional component of the same controller.

The actuating signals $TV_{DK}$ of the throttle valve and $TV_{BV}$ of the bypass valve are multiplied in respective multipliers 31, 32 by the battery voltage $U_{Batt}$ which can be corrected by a characteristic 27 to compensate for differences in the voltage supply. In respective output stages 46, 47 arranged on the output side, the signals are transformed into the final actuating voltages $U_{DK}$ and $U_{BV}$, respectively, which, as shown in FIG. 1, act upon the actuators 18, 19 for the respective throttle valve DK and the bypass valve BV.

All of the characteristics or characteristic maps of the desired-value transmitter 9 and of the controller unit 10 are advantageously stored as data values in a memory. The data obtained from measurements and experience can be matched individually to each valve device. It is furthermore within the contemplation of the present invention to specify a mathematical function, instead of stored data values, to supply a precise initial value for each input value.

Instead of the two valve devices described above, other valve devices can also be provided. Thereby the intake pressure P2 can be adjusted. Each valve device is assigned a control characteristic map and a controller. It is also within the scope of the present invention to provide just one valve device, for example only the throttle valve or only the bypass valve and, accordingly, to provide just one control characteristic map with a superimposed controller.

If required, the comparison element 33 can be incorporated in the desired-value transmitter 9 and the switching-signal transmitter 15 can be incorporated in the controller unit 10 in order to produce a uniform switching signal for the determination of the load state of the internal combustion engine. It is also contemplated to use a PID controller or some other suitable type of controller instead of a PI controller.

The apparatus according to the invention can also be used with Otto internal combustion engines as well as diesel engines.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for regulating pressure in an intake duct of an internal combustion engine having an exhaust turbocharger arranged in the exhaust line, comprising a bypass valve, a bypass conduit configured to be shut off by the bypass valve and to bypass the turbocharger turbine, and a control unit configured to effect a load-dependent setting of the bypass valve, wherein the control unit comprises a desired-value transmitter and a controller unit, and the controller unit has a memory, with a respective control characteristic map for the bypass valve, and a bypass valve controller.

2. Apparatus according to claim 1, wherein the controller unit comprises a first summer for the formation of a system deviation from an absolute desired pressure value to be set and current pressure of the intake duct.

3. Apparatus according to claim 2, wherein the controller has an input for a signal of the system deviation and is one of PI controller and PID controller.

4. Apparatus according to claim 1, wherein the control characteristic map is supplied with a gage desired pressure value.

5. Apparatus according to claim 1, wherein the control characteristic map assigned to the bypass valve and the bypass valve controller are connected in parallel, an actuating signal being formed from the control characteristic map signal and the controller signal in a summer.

6. Apparatus according to claim 1, wherein the desired-value transmitter of the control unit includes a characteristic map for a desired pressure base value stored in the memory, a summer for formation of a desired-pressure base value, a comparison element for determining the load state of the internal combustion engine, at least one switching element for load-dependent switching between characteristic maps of ambient characteristic variables, at least one multiplier for subjecting the desired-pressure base value to signals of the characteristic maps of the ambient characteristic variables, a second summer for addition of ambient air pressure, and a comparison element for limiting absolute desired pressure value as a function of a limit value characteristic map.

7. Apparatus according to claim 1, wherein the bypass valve is associated with an actuator which is configured to be fed with an actuating signal in a form of actuating voltage from the control unit.

8. Apparatus for regulating pressure in an intake duct of an internal combustion engine comprising a throttle valve in the intake duct, an exhaust turbocharger arranged in an exhaust line, a bypass valve, a bypass conduit arranged to be shut off by the bypass valve and to bypass the turbocharger turbine, and a control unit configured to effect a load-dependent setting of the throttle valve and the bypass valve, wherein the control unit comprises a desired-value transmitter and a controller unit, and the controller unit includes a switching-signal transmitter, a switching element, a memory with respective control characteristic maps for the throttle valve and the bypass valve and respective controllers, each of which is independently activatable as a function of predetermined switching criteria by the switching-signal transmitter and the switching element.

9. Apparatus according to claim 8, wherein the controller unit comprises a first summer for the formation of a system deviation from an absolute desired pressure value to be set and current pressure.

10. Apparatus according to claim 9, wherein the controllers have an input for a signal of the system deviation and are one of PI controllers and PID controllers.

11. Apparatus according to claim 8, wherein the control characteristic maps are supplied with a gage desired pressure value.

12. Apparatus according to claim 8, wherein the respective control characteristic maps assigned to the throttle valve and the bypass valve and the corresponding controllers are connected in parallel, an actuating signal being formed from the respective control characteristic map signal and the controller signal in a summer.

13. Apparatus according to claim 8, wherein the desired-value transmitter of the control unit includes a characteristic map for a desired pressure base value stored in the memory, a summer for formation of a desired-pressure base value, a comparison element for determining the load state of the internal combustion engine, at least one switching element for load-dependent switching between characteristic maps of ambient characteristic variables, at least one multiplier for subjecting the desired-pressure base value to signals of the characteristic maps of the ambient characteristic variables, a second summer for addition of ambient air pressure, and a comparison element for limiting absolute desired pressure value as a function of a limited value characteristic map.

14. Apparatus according to claim 8, wherein the throttle valve and the bypass valve are associated with respective actuators which are configured to be fed with an actuating signal in a form of actuating voltage from the control unit.

* * * * *